(12) United States Patent
Bammann et al.

(10) Patent No.: US 10,457,399 B2
(45) Date of Patent: Oct. 29, 2019

(54) AIRCRAFT AIR CONDITIONING SYSTEM AND METHOD OF OPERATING AN AIRCRAFT AIR CONDITIONING SYSTEM

(71) Applicant: Airbus Operations GmbH, Hamburg (DE)

(72) Inventors: Holger Bammann, Hamburg (DE); Frank Klimpel, Hamburg (DE); Hans Brunswig, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 729 days.

(21) Appl. No.: 14/859,610

(22) Filed: Sep. 21, 2015

(65) Prior Publication Data

US 2016/0083100 A1    Mar. 24, 2016

(30) Foreign Application Priority Data

Sep. 19, 2014  (EP) .................................... 14185484
May 19, 2015   (EP) .................................... 15168140

(51) Int. Cl.
*B64D 13/06* (2006.01)

(52) U.S. Cl.
CPC ...... *B64D 13/06* (2013.01); *B64D 2013/0618* (2013.01); *B64D 2013/0648* (2013.01); *B64D 2013/0688* (2013.01); *Y02T 50/56* (2013.01)

(58) Field of Classification Search
CPC ............ B64D 13/06; B64D 2013/0648; B64D 2013/0688; B64D 2013/0618; Y02T 50/56
USPC .................................................... 62/89, 172
See application file for complete search history.

(56) References Cited

U.S. PATENT DOCUMENTS

| | | | | |
|---|---|---|---|---|
| 2,767,561 A | * | 10/1956 | Seeger | B64D 13/06 417/406 |
| 3,177,676 A | * | 4/1965 | Abrahams | B64D 13/06 62/172 |
| 4,262,495 A | * | 4/1981 | Gupta | B64D 13/06 62/172 |

(Continued)

FOREIGN PATENT DOCUMENTS

| | | |
|---|---|---|
| CN | 102971215 | 3/2013 |
| DE | 102008053320 | 5/2010 |

(Continued)

OTHER PUBLICATIONS

Chinese Office Action, dated May 1, 2017.
European Search Report, dated Feb. 20, 2015.

*Primary Examiner* — Cassey D Bauer
*Assistant Examiner* — Kirstin U Oswald
(74) *Attorney, Agent, or Firm* — Greer, Burns & Crain, Ltd.

(57) ABSTRACT

An aircraft air conditioning system including an ambient air supply line having a first end connected to an ambient air inlet and a second end connected to a mixer of the aircraft air conditioning system so as to supply ambient air to the mixer. A first compressor is arranged in the ambient air supply line and is configured to compress the ambient air flowing through the ambient air supply line. A bleed air supply line allows a flow of bleed air bled off from an engine or an auxiliary power unit therethrough. A bleed air turbine is driven by the bleed air flowing through the bleed air supply line and is coupled to the first compressor so as to drive the first compressor.

15 Claims, 6 Drawing Sheets

(56) References Cited

U.S. PATENT DOCUMENTS

| | | | | |
|---|---|---|---|---|
| 4,263,786 A | * | 4/1981 | Eng | B64D 13/06 62/172 |
| 4,283,924 A | * | 8/1981 | Schutze | B64D 13/06 62/172 |
| 4,419,926 A | | 12/1983 | Cronin et al. | |
| 5,299,763 A | * | 4/1994 | Bescoby | B64D 13/06 244/118.5 |
| 5,461,882 A | * | 10/1995 | Zywiak | B60H 1/00007 62/401 |
| 5,704,218 A | * | 1/1998 | Christians | B64D 13/06 62/172 |
| 5,899,085 A | * | 5/1999 | Williams | B64D 13/06 62/236 |
| 6,189,324 B1 | * | 2/2001 | Williams | B64D 13/06 62/172 |
| 6,283,410 B1 | * | 9/2001 | Thompson | B64D 41/00 244/59 |
| 6,908,062 B2 | * | 6/2005 | Munoz | B64D 13/06 244/118.5 |
| 2006/0174628 A1 | * | 8/2006 | Mikhail | B64D 13/00 60/772 |
| 2008/0271465 A1 | * | 11/2008 | Mossberg | B64D 13/02 62/5 |
| 2009/0117840 A1 | * | 5/2009 | Kresser | B64D 13/06 454/71 |
| 2010/0101251 A1 | | 4/2010 | Kelnhofer | |
| 2011/0047971 A1 | | 3/2011 | Mullins et al. | |
| 2012/0285184 A1 | * | 11/2012 | Voinov | B64D 13/06 62/87 |
| 2013/0067945 A1 | | 3/2013 | Kelnhofer | |
| 2013/0133348 A1 | * | 5/2013 | Squier | B64D 13/08 62/172 |
| 2013/0269374 A1 | | 10/2013 | Kelnhofer | |

FOREIGN PATENT DOCUMENTS

| | | | |
|---|---|---|---|
| DE | 102010034831 | 4/2011 | |
| DE | 102010054448 | 6/2012 | |
| WO | WO-0216743 A1 * | 2/2002 | ............ B64D 13/006 |
| WO | 2012022754 | 2/2012 | |
| WO | 2012079756 | 6/2012 | |

* cited by examiner

AIRCRAFT AIR CONDITIONING SYSTEM AND METHOD OF OPERATING AN AIRCRAFT AIR CONDITIONING SYSTEM

CROSS-REFERENCES TO RELATED APPLICATIONS

This application claims the benefit of the European patent application No. 14 185 484.4 filed on Sep. 19, 2014 and of the European patent application No. 15 168 140.0 filed on May 19, 2015, the entire disclosures of which are incorporated herein by way of reference.

BACKGROUND OF THE INVENTION

The present invention relates to an aircraft air conditioning system and a method of operating an aircraft air conditioning system.

So-called air-based air conditioning systems, as described for example in DE 10 2008 053 320 A1 and US 2010/101251 A1 or DE 10 2010 054 448 A1 and WO 2012/079756 A2, are usually used at present in commercial aircraft to air-condition the aircraft cabin. An aircraft air conditioning system serves to adequately cool or heat the aircraft cabin and to adequately supply fresh air into the aircraft cabin to ensure that a prescribed minimum proportion of oxygen is present in the aircraft cabin. Further, the humidity within the aircraft cabin is adjusted by means of the aircraft air conditioning system. Moreover, during flight operation of the aircraft, the aircraft air conditioning system is used to pressurize the aircraft cabin so as to maintain the pressure within the aircraft cabin, compared to the ambient pressure at the cruising altitude of the aircraft, at an elevated level.

Air-based air conditioning systems typically comprise an air conditioning unit, which is arranged, for example, in a wing root of the aircraft, and which is supplied with compressed process air that is generated by a compressor or bled off from an engine or an auxiliary power unit (APU) of the aircraft. During flight operation of the aircraft, usually engine bleed air is used so as to supply the air conditioning unit of the aircraft air conditioning system with compressed process air. During ground operation of the aircraft the air conditioning unit of the aircraft air conditioning system, however, typically is supplied with compressed process air from the auxiliary power unit of the aircraft. In the air conditioning unit, the process air, upon flowing through at least one heat exchanger as well as through various compression and expansion units, is cooled and expanded. Cooled process air exiting the air conditioning unit finally is supplied to a mixing chamber where it is mixed with recirculation air recirculated from an aircraft region to be air conditioned. The mixed air from the mixing chamber, via respective mixed air lines, is supplied to the aircraft region to be air conditioned which may be divided into a plurality of air conditioning zones.

DE 10 2010 034 831 A1 and WO 2012/022758 A1 describe an aircraft air conditioning system, wherein compressed process air that is bled off from an engine of the aircraft is cooled by transferring heat to a refrigerant circulating through a refrigerant circuit. A turbine which serves to expand the compressed process air prior to being directed into an aircraft cabin is used to drive a compressor disposed in the refrigerant circuit.

SUMMARY OF THE INVENTION

The invention is directed at the object of specifying an aircraft air conditioning system which, at least during normal operation, allows a cabin of an aircraft equipped with the aircraft air conditioning system to be supplied with ambient air. Further, the invention is directed at the object of providing a method of operating an aircraft air conditioning system of this kind.

An aircraft air conditioning system comprises an ambient air supply line allowing a flow of ambient air therethrough. The ambient air supply line has a first end connected to an ambient air inlet and a second end connected to a mixer of the aircraft air conditioning system so as to supply ambient air to the mixer. The first end of the ambient air supply line may be directly connected to the ambient atmosphere, for example, via an opening provided in an aircraft outer skin via which the ambient air might be supplied to the ambient air supply line. The opening may, for example, be designed in the form of a scoop air inlet. It is, however, also conceivable that the ambient air supply line branches off from a further ambient air conducting line or a ram air channel.

The aircraft air conditioning system further comprises a first compressor arranged in the ambient air supply line and being adapted to compress the ambient air flowing through the ambient air supply line. In particular, the first compressor is adapted to compress the ambient air flowing through the ambient air supply line to an elevated pressure which allows the ambient air, after being further processed, to be supplied to the mixer of the aircraft air conditioning system where it may be mixed with recirculation air recirculated from an aircraft cabin before the mixed air generated in the mixer is supplied to the aircraft cabin so as to air-condition the aircraft cabin.

A bleed air supply line of the aircraft air conditioning system allows a flow of bleed air bled off from an engine or an auxiliary power unit therethrough. The bleed air supply line has a first end connected to an engine or an auxiliary power unit of the aircraft, wherein the supply of bleed air into the bleed air supply line may be controlled by a suitable valve. A second end of the bleed air supply line is connected to an aircraft environment, e.g., via a suitable bleed air discharge device such as a ram air channel. Thus, the bleed air exiting the bleed air supply line is discharged to the ambient atmosphere instead of being supplied to a mixer of the aircraft air conditioning system as in conventional aircraft air conditioning systems.

A bleed air turbine is driven by the bleed air flowing through the bleed air supply line. Thus, in the aircraft air conditioning system, the bleed air flowing through the bleed air supply line is supplied to the bleed air turbine, wherein the bleed air is expanded and thus cooled. Thereafter, the bleed air may be discharged to the aircraft environment, i.e., to the ambient atmosphere. The bleed air turbine may be designed as a two stage turbine or may have a variable nozzle design. The operation of the bleed air turbine then may be controlled in a flexible manner in dependence on the actual operating conditions of the aircraft air conditioning system.

The bleed air turbine is coupled to the first compressor so as to drive the first compressor. For example, the bleed air turbine and the first compressor may be arranged on a common shaft. In the aircraft air conditioning system, the bleed air thus is used to drive the first compressor arranged in the ambient air supply line. The cabin of an aircraft equipped with the aircraft air conditioning system, however, at least during normal operation of the aircraft air conditioning system, is supplied with ambient air which, via the first compressor, is compressed to the required elevated pressure before being supplied to the mixer of the aircraft air conditioning system.

In a preferred embodiment, the aircraft air conditioning system further comprises an ambient air branch line branching off from the ambient air supply line upstream of the first compressor. The ambient air branch line may open into the ambient air supply line downstream of the first compressor and hence bypass the first compressor. The terms "upstream" and "downstream," in this context, refer to the direction of flow of ambient air through the ambient air supply line. A second compressor may be arranged in the ambient air branch line. The second compressor may be adapted to compress the ambient air flowing through the ambient air branch line. Similar to the first compressor, the second compressor may be adapted to compress the ambient air flowing through the ambient air branch line to an elevated pressure which allows the ambient air, after being further processed, to be supplied to the mixer of the aircraft air conditioning system. Basically, the second compressor, like the first compressor, may be driven by means of the bleed air turbine driving the first compressor or an additional bleed air turbine.

Preferably, however, the aircraft air conditioning system further comprises a cabin exhaust air line allowing a flow of cabin exhaust air therethrough. A cabin exhaust air control valve may be provided in the cabin exhaust air line so as to control the flow of cabin exhaust air through the cabin exhaust air line. Further, the aircraft air conditioning system may comprise a cabin exhaust air turbine driven by the cabin exhaust air flowing through the cabin exhaust air line. Hence, the cabin exhaust air flowing through the cabin exhaust air line may be supplied to the cabin exhaust air turbine, wherein the cabin exhaust air is expanded and thus cooled.

The cabin exhaust air turbine may be coupled to the second compressor so as to drive the second compressor. For example, the cabin exhaust air turbine and the second compressor may be arranged on a common shaft. In a preferred embodiment of the aircraft air conditioning system, the cabin exhaust air discharged from the aircraft cabin thus is used to drive the second compressor arranged in the ambient air branch line independent of the first compressor arranged in the ambient air supply line. As a result, a sufficient amount of compressed ambient air can be supplied to the mixer of the aircraft air conditioning system, even during flight operation of an aircraft equipped with the aircraft air conditioning system at high altitudes and thus at a low ambient pressure. Furthermore, by making use of the energy contained in the cabin exhaust air, the bleed air demand for driving the bleed air turbine and hence fuel burn penalty due to the bleed off of air from the aircraft engine can be reduced. The aircraft air conditioning system thus can be operated with a particularly high energy efficiency.

The aircraft air conditioning system may further comprise a connecting line connecting the ambient air supply line to the ambient air branch line. In particular, the connecting line may connect the ambient air supply line downstream of the first compressor to the ambient air branch line upstream of the second compressor. The terms "downstream" and "upstream," in this context, refer to the direction of flow of the ambient air through the ambient air supply line and the ambient air branch line, respectively. Via the connecting line, the first compressor and the second compressor may be connected in series, i.e., ambient air at an elevated pressure which exits the first compressor may be supplied to the second compressor so as to be further compressed.

An ambient air supply control valve may be provided which is adapted to control the supply of ambient air to the second compressor. In particular, the ambient air supply control valve may be adapted to control at least one of the flow of ambient air through the connecting line and the flow of ambient air through the ambient air branch line. For example, the ambient air supply control valve may be designed in the form of a three-way valve which is arranged in the region of an opening of the connecting line into the ambient air branch line. The ambient air supply control valve then is adapted to connect the first compressor and the second compressor either in series or in parallel, or to interrupt the supply of ambient air to the second compressor as desired.

The aircraft air conditioning system may further comprise an electronic control unit which is adapted to control the operation of the cabin exhaust air control valve and thus the flow of cabin exhaust air through the cabin exhaust air line. Further, the electronic control unit may be adapted to control the operation of the ambient air supply control valve and hence the supply of ambient air to the second compressor. Preferably, the electronic control unit is adapted to control the operation of the cabin exhaust air control valve and/or the operation of the ambient air supply control valve in dependence on an ambient air demand of the aircraft air conditioning system. For example, the electronic control unit may control the cabin exhaust air control valve and/or the ambient air supply control valve in such a manner that the amount of compressed ambient air exiting the second compressor is increased in response to an increase in the ambient air demand of the aircraft air conditioning system. Similarly, the electronic control unit may control the cabin exhaust air control valve and the ambient air supply valve in such a manner that the amount of compressed ambient air exiting the second compressor is decreased or even reduced to zero in response to a decrease in the ambient air demand of the aircraft air conditioning system.

In a particularly preferred embodiment, the electronic control unit is adapted to control the operation of the cabin exhaust control valve and the ambient air supply control valve in a synchronized manner in dependence on an ambient air control demand of the aircraft air conditioning system. This allows a particularly efficient operation of the second compressor, since it is ensured that the cabin exhaust air turbine is supplied with a sufficient amount of cabin exhaust air in order to provide the required amount of driving energy for driving the second compressor so as to compress the ambient air supplied to the second compressor in a controlled manner to the desired elevated pressure.

A compressed air recirculation line may connect a portion of the ambient air supply line which extends downstream of the first compressor with a portion of the ambient air supply line which extends upstream of the first compressor. The terms "upstream" and "downstream," in this context, refer to the direction of flow of the ambient air through the ambient air supply line. Thus, compressed air exiting the first compressor, via the compressed air recirculation line, may be recirculated to the first compressor to be compressed again. This allows an improvement of the heating performance of the aircraft air conditioning system in case the aircraft air conditioning system should be used for heating purposes. A recirculation control valve may be provided for controlling the flow of compressed air exiting the first compressor through the compressed air recirculation line back to the first compressor.

The aircraft air conditioning system may further comprise a reheater which is arranged in the cabin exhaust air line. In particular, the reheater may be arranged in the cabin exhaust air line upstream of the cabin exhaust air turbine. The term "upstream," in this context, refers to the direction of flow of the cabin exhaust air through the cabin exhaust air line. By heating the cabin exhaust air flowing through the cabin exhaust air line prior to being supplied to the cabin exhaust air turbine, the driving energy potential of the cabin exhaust air turbine can be enhanced. Moreover, the risk that free water is present in the cabin exhaust air at an inlet and/or an outlet of the cabin exhaust air turbine can be reduced. Preferably, the reheater is thermally coupled to the bleed air supply line. As a result, the cabin exhaust air flowing through the cabin exhaust air line, in the reheater, can be heated by the transport of heat energy from the bleed air flowing through the bleed air supply line to the cabin exhaust air flowing through the cabin exhaust air line.

The aircraft air conditioning system may further comprise a precooler which is arranged in the bleed air supply line and which serves to cool the bleed air flowing through the bleed air supply line. Preferably, the precooler is thermally coupled to a ram air channel. The bleed air flowing through the bleed air supply line, in the precooler, then can be cooled by the transport of heat energy from the bleed air flowing through the bleed air supply line to ram air flowing through the ram air channel.

The reheater for re-heating the cabin exhaust air flowing through the cabin exhaust air line may be thermally coupled to the bleed air supply line at different positions. In a first embodiment of the aircraft air conditioning system, the reheater is thermally coupled to the bleed air supply line upstream of the precooler arranged in the bleed air supply line. In a second embodiment of the aircraft air conditioning system, the reheater is thermally coupled to the bleed air supply line downstream of the precooler arranged in the bleed air supply line. The terms "upstream" and "downstream," in this context, refer to the direction of flow of the bleed air through the bleed air supply line. By arranging the reheater in thermal contact with the bleed air supply line upstream of the precooler, the bleed air consumption of the overall system can be reduced. Arranging the thermal coupling between the reheater and the bleed air supply line downstream of the precooler arranged in the bleed air supply line, however, allows a reduction of the ram air flow through the ram air channel. Hence, the architecture of the aircraft air conditioning system can be adapted in dependence of whether either a minimized bleed air consumption or a minimized ram air consumption of the reheater is desired.

The aircraft air conditioning system may further comprise an ambient air cooler which is arranged in the ambient air supply line and which serves to cool the ambient air flowing through the ambient air supply line prior to being supplied to the mixer of the aircraft air conditioning system. Preferably, the ambient air cooler is arranged in the ambient air supply line downstream of the first compressor, wherein the term "downstream," in this context, refers to the direction of flow of ambient air through the ambient air supply line. The ambient air cooler may be thermally coupled to the ram air channel. The ambient air, in the ambient air cooler, then may be cooled by the transport of heat energy from the ambient air flowing through the ambient air supply line to ram air flowing through the ram air channel.

In case the aircraft air conditioning system is provided with both, a precooler arranged in the bleed air supply line and an ambient air cooler arranged in the ambient air supply line, the precooler and the ambient air cooler may be arranged in the ram air channel either in parallel or in series. In case a parallel arrangement of the precooler and the ambient air cooler in the ram air channel is desired, the precooler and the ambient air cooler, for example, may be arranged in two parallel ram air channel branches which each have ram air flowing therethrough independent from each other. This configuration ensures that both, the precooler and the ambient air cooler, are supplied with ram air having the same temperature and hence the same cooling capacity. However, in case a simple and hence lightweight design of the ram air channel is desired, it is also conceivable to arrange the precooler and the ambient air cooler in the ram air channel in series, i.e., the ram air may first be directed through the ambient air cooler and only thereafter through the precooler or vice versa.

The aircraft air conditioning system may further be provided with a condenser which may be arranged in the ambient air supply line. In particular, the condenser may be arranged in the ambient air supply line downstream of the ambient air cooler, wherein the term "downstream," in this context, refers to the direction of flow of ambient air through the ambient air supply line. The condenser may be thermally coupled to the bleed air supply line. This allows the ambient air, in the condenser, to be cooled by the transport of heat energy from the ambient air flowing through the ambient air supply line to the bleed air flowing through the bleed air supply line. Preferably, the condenser is supplied with bleed air flowing through the bleed air supply line downstream of the bleed air turbine, wherein the term "downstream," in this context, refers to the direction of flow of bleed air through the bleed air supply line. This configuration ensures that the bleed air is supplied to the condenser at the desired low temperature. Within the condenser, the ambient air preferably is cooled below the dew point of water in order to condense the free water present in the ambient air flowing through the ambient air supply line before the ambient air is directed into the mixer of the aircraft air conditioning system.

In addition, a water separator may be arranged in the ambient air supply line, in particular downstream of the condenser, wherein the term "downstream," in this context, refers to the direction of flow of ambient air through the ambient air supply line. For example, the water separator may be designed in the form of a high pressure separator and may serve to remove liquid water condensed from the ambient air stream upon being cooled in the condenser. Liquid water removed from the ambient in the water separator may be discharged into the ram air channel so as to be discharged to the ambient atmosphere, together with the ram air flowing through the ram air channel. In a particular preferred embodiment of the aircraft air conditioning system, water removed from the ambient air in the water separator, via a spring nozzle or another suitable supply device, is injected into the ram air channel, preferably upstream of an ambient air cooler and/or a precooler arranged in the ram air channel, wherein the term "upstream," in this context, refers to the direction of flow of ram air through the ram air channel. By injecting the liquid water into the ram air channel, the ram air flowing through the ram air channel may be cooled, thus enhancing the cooling capacity of the ram air prior to being supplied to the ambient air cooler and/or the precooler.

The aircraft air conditioning system may further comprise an ambient air turbine which is driven by the ambient air flowing through the ambient air supply line. In particular, the ambient air turbine is arranged in the ambient air supply line downstream of the water separator, wherein the term "downstream," in this context, refers to the direction of flow of ambient air through the ambient air supply line. Within the ambient air turbine, the ambient air is expanded and thus cooled prior to being supplied to the mixer of the aircraft air conditioning system. The ambient air turbine may be coupled to the first compressor so as to drive the first compressor. For example, the ambient air turbine may be arranged with the first compressor and preferably also the bleed air turbine on a common shaft. This configuration allows a particularly energy-efficient operation of the aircraft air conditioning system.

A trim air line may branch off from the ambient air supply line, in particular between the first compressor and the ambient air cooler. The trim air line may open into the ambient air supply line downstream of the ambient air turbine, wherein the term "downstream," in this context, refers to the direction of flow of ambient air through the ambient air line. Via the trim air line, ambient air at an elevated pressure and at an elevated temperature may be supplied to the ambient air exiting the ambient air turbine thus allowing ambient air at a desired temperature and a desired pressure to be supplied to the mixer of the aircraft air conditioning system. An additional hot air tapping line may branch off from the trim air line. This allows to supply trim air also to other areas than the mixer unit. A hot air regulation valve (HARV) may be used to regulate the amount of trim air.

The aircraft air conditioning system may further comprise an altitude vent line which branches off from the ambient air supply line upstream of the ambient air turbine and in particular upstream of the condenser. The altitude vent line may open into the ambient air supply line downstream of the ambient air turbine, wherein the terms "upstream" and "downstream," in this context, refer to the direction of flow of ambient air through the ambient air supply line. An altitude vent valve may be arranged in the altitude vent line so as to control the flow of ambient air through the altitude vent line. The altitude vent line thus bypasses the condenser, the water separator and the ambient air turbine and may, during flight operation of an aircraft equipped with the aircraft air conditioning system, be used to increase permeability of the ambient air supplied to the mixer of the aircraft air conditioning system and hence to reduce the effort for pressurizing the ambient air.

The aircraft air conditioning system may further be provided with an emergency ambient air supply line which directly connects the ambient air inlet to the mixer of the aircraft air conditioning system. Thus, via the emergency ambient air supply line, in the event of a failure of the aircraft air conditioning system, ambient air entering the system via the ambient air inlet can be directly supplied to the mixer of the aircraft air conditioning system, thus ensuring that at least the basic ambient air demand of the aircraft air conditioning system is satisfied. A shut off valve (SOV) may be used to open this emergency air supply line when needed.

The aircraft air conditioning system may also be equipped with a bypass line which is adapted to bypass the reheater. For example, the bypass line may connect a portion of the bleed air supply line extending upstream of the reheater to a portion of the bleed air supply line extending downstream of the reheater, so as to bypass the reheater. The terms "upstream" and "downstream," in this context, refer to the direction of flow of the bleed air through the bleed air supply line. A bypass valve may be arranged in the bypass line and may be adapted to control the flow of bleed air through the bypass line.

A further bypass line may be provided which is adapted to bypass the precooler. For example, the further bypass line may connect a portion of the bleed air supply line extending between the reheater and the precooler to a portion of the bleed air supply line extending downstream of the precooler, so as to bypass the precooler. The terms "upstream" and "downstream," in this context, again refer to the direction of flow of the bleed air through the bleed air supply line. A further bypass valve may be arranged in the further bypass line and may be adapted to control the flow of bleed air through the further bypass line.

Operation of the bypass valves and hence the flows of bleed air through the bypass line and the reheater, respectively, and the flows of bleed air through the further bypass line and the precooler, respectively, may be controlled in dependence on a desired discharge temperature of the bleed air turbine so as to optimize the cooling performance of the aircraft air conditioning system. Furthermore, by supplying a sufficient amount of hot bleed air which bypasses the reheater and/or the precooler to the bleed air turbine, icing of the bleed air turbine can be prevented.

A cabin exhaust air branch line may branch off from the cabin exhaust air line just before the air enters an ejector device and may open into the ram air channel, preferably downstream of the ambient air precooler and the precooler. The term "downstream," in this context, refers to the direction of flow of ram air through the ram air channel. A cabin air dump valve may be disposed in the cabin exhaust air branch line in particular downstream of the cabin exhaust air turbine and serves to control the flow of cabin exhaust air to be dumped either upstream of the ambient air precooler and the precooler or downstream of them. In case the cabin exhaust air branch line opens into the ram air channel downstream of the ambient air precooler and the precooler, undesired heating of the ram air prior to being supplied to the ambient air precooler and the precooler due to the supply of cabin exhaust air to the ram air channel can be avoided.

The aircraft air conditioning system may further comprise a backup line which branches off from the bleed air supply line, in particular downstream of the condenser. The term "downstream," in this context, refers to the direction of flow of bleed air through the bleed air supply line. A backup valve may be arranged in the backup line so as to control the flow of bleed air through the backup line. For example, the backup valve may be designed in the form of a three-way valve which may be disposed in the region of a branch point between the backup line and the bleed air supply line. Via the backup line, bleed air can be supplied to the mixer of the aircraft air conditioning system in the event of a failure of the ambient air system, i.e., in the event that the supply of ambient air to the mixer is interrupted or affected in order to satisfy the air demand of the mixer. However, during operation of the aircraft air conditioning system in pure ambient air mode, the backup valve remains closed in order to prevent bleed air from entering the mixer. As an alternative, the backup valve may be used to control the supply of bleed air, either the total amount of bleed air or only a part of the bleed air to the mixer. This operation can be an intended normal mode of operation or only a failure mode acting as backup to the pure ambient air mode.

The aircraft air conditioning system may further be equipped with a bleed air branch line which branches off from the bleed air supply line and which is adapted have hot (untreated) bleed air flowing therethrough. For example, the bleed air branch line may branch off from the bleed air supply line upstream of the reheater and also upstream of an upstream-side connecting point of the bypass line with the bleed air supply line. The term "upstream," in this context, refers to the direction of flow of the bleed air through the bleed air supply line. A hot air regulation valve may be disposed in the bleed air branch line so as to control the flow of hot bleed air through the bleed air branch line. In case the aircraft air conditioning system should be used for heating purposes, the hot air regulation valve can be suitably controlled in order to allow a desired volume flow of hot bleed air through the bleed air branch line which may be used for heating purposes in addition to or instead of hot ambient air flowing through the additional trim air line. It should, however, be noted that the bleed air flowing through the bleed air branch line should not be directed into the mixer so as to ensure that, at least during normal operation of the aircraft air conditioning system, the mixer is exclusively supplied with ambient air and, if desired, recirculation air which is recirculated from the aircraft cabin to be air conditioned.

At least one of the bleed air supply line and the cabin exhaust air line may open into the ram air channel. By discharging residual bleed air and residual cabin exhaust air into the ram air channel, the flow of ram air through the ram air channel can be reduced while still providing a sufficient amount of cooling energy to the ambient air cooler and/or the precooler arranged in the ram air channel. In a particular preferred embodiment, the cabin exhaust air line is connected to an ejector disposed in the ram air channel. The ejector preferably is adapted to inject the cabin exhaust air flowing through the cabin exhaust air line at an increased speed and pressure thus enhancing the cooling capacity of the cabin exhaust air. The ejector may be driven by the bleed air exiting the bleed air supply line thus allowing a particularly energy-efficient operation of the ejector.

In a method of operating an aircraft air conditioning system a flow of ambient air is guided through an ambient air supply line having a first end connected to an ambient air inlet and a second end connected to a mixer of the aircraft air conditioning system so as to supply ambient air to the mixer. The ambient air flowing through the ambient air supply line is compressed via a first compressor arranged in the ambient air supply line. A flow of bleed air bled off from an engine or an auxiliary power unit is guided through a bleed air supply line having a first end connected to the engine or the auxiliary power unit and a second end connected to an aircraft environment. A bleed air turbine is driven by the bleed air flowing through the bleed air supply line, the bleed air turbine being coupled to the first compressor so as to drive the first compressor.

A flow of ambient air may be guided through an ambient air branch line branching off from the ambient air supply line upstream of the first compressor and opening into the ambient air supply line downstream of the first compressor. The ambient air flowing through the ambient air branch line may be compressed by means of a second compressor arranged in the ambient air branch line. A flow of cabin exhaust air may be guided through a cabin exhaust air line. The flow of cabin exhaust air through the cabin exhaust air line in particular may be controlled via a cabin exhaust air control valve arranged in the cabin exhaust air line. A cabin exhaust air turbine may be driven by means of the cabin exhaust air flowing through the cabin exhaust air line, the cabin exhaust air turbine being coupled to the second compressor so as to drive the second compressor.

A flow of ambient air may be guided through a connecting line connecting the ambient air supply line downstream of the first compressor to the ambient air branch line upstream of the second compressor. The supply of ambient air to the second compressor may be controlled via an ambient air supply control valve. In particular, the supply of ambient air to the second compressor, via the ambient air supply control valve, may be controlled by controlling at least one of the flow of ambient air through the connecting line and the flow of ambient air through the ambient air branch line. The operation of the cabin exhaust air control valve and the ambient air supply control valve may be controlled in a synchronized manner in dependence on an ambient air demand of the aircraft air conditioning system.

A flow of compressed air may be guided through a compressed air recirculation connecting a portion of the ambient air supply line which extends downstream of the first compressor with a portion of the ambient air supply line which extends upstream of the first compressor. The flow of compressed air exiting the first compressor through the compressed air recirculation line back to the first compressor may be controlled by means of a recirculation control valve.

The cabin exhaust air flowing through the cabin exhaust air line may be heated via a reheater arranged in the cabin exhaust air line, in particular upstream of the cabin exhaust air turbine, preferably by transporting heat energy from the bleed air flowing through the bleed air supply line to the cabin exhaust air flowing through the cabin exhaust air line. The bleed air flowing through the bleed air supply line may be cooled by means of a precooler arranged in the bleed air supply line, preferably by transporting heat energy from the bleed air flowing through the bleed air supply line to ram air flowing through a ram air channel. The reheater may be thermally coupled to the bleed air supply line either upstream or downstream of the precooler.

The ambient air flowing through the ambient air supply line may be cooled via an ambient air cooler arranged in the ambient air supply line, in particular downstream of the first compressor, preferably by transporting heat energy from the ambient air flowing through the ambient air supply line to ram air flowing through the ram air channel. Water contained in the ambient air flowing through the ambient air supply line may be condensed by means of a condenser arranged in the ambient air supply line, in particular downstream of the ambient air cooler, preferably by transporting heat energy from the ambient air flowing through the ambient air supply line to the bleed air flowing through the bleed air supply line. Water contained in the ambient air flowing through the ambient air supply line may be separated from the ambient air via a water separator arranged in the ambient air supply line, in particular downstream of the condenser.

An ambient air turbine may be driven by the ambient air flowing through the ambient air supply line, the ambient air turbine preferably being coupled to the first compressor so as to drive the first compressor. A flow of ambient air may be guided through a trim air line branching off from the ambient air supply line between the first compressor and the ambient air cooler and opening into the ambient air supply line downstream of the ambient air turbine. A flow of ambient air may be guided through an altitude vent line branching off from the ambient air supply line upstream of the ambient air turbine, in particular upstream of the condenser, and opening into the ambient air supply line downstream of the ambient air turbine.

The flow of ambient air through the altitude vent line preferably is controlled by means of an altitude vent valve arranged in the altitude vent line. A flow of ambient air may be guided through an emergency ambient air supply line directly connecting the ambient air inlet to the mixer of the aircraft air conditioning system. A flow of bleed air may be guided through a bypass line so as to bypass the reheater. The flow of bleed air through the bypass line may be controlled via a bypass valve. A flow of bleed air may be guided through a further bypass line so as to bypass the precooler. The flow of bleed air through the further bypass line may be controlled by means of a further bypass valve. A flow of cabin exhaust air may be guided through a cabin exhaust air branch line branching off from the cabin exhaust air line, in particular downstream of the cabin exhaust air turbine, and opening into the ram air channel, in particular downstream of the ambient air precooler and the precooler. The flow of cabin exhaust air through the cabin exhaust air branch line, in particular downstream of the cabin exhaust air turbine, may be controlled via a cabin air dump valve.

A flow of bleed air may be guided through a backup line branching off from the bleed air supply line, in particular downstream of the condenser. The flow of bleed air through the backup line preferably is controlled by means of a backup valve arranged in the backup line. A flow of hot bleed air may be guided through a bleed air branch line branching off from the bleed air supply line. The flow of hot bleed air through the bleed air branch line may be controlled via a hot air regulation valve.

At least one of bleed air flowing through the bleed air supply line and cabin exhaust air flowing through the cabin exhaust air line may be guided into the ram air channel. The cabin exhaust air preferably is supplied to the ram air channel via an ejector disposed in the ram air channel which is adapted to inject the cabin exhaust air flowing through the cabin exhaust air line into the ram air channel. The ejector may be driven by the bleed air exiting the bleed air supply line.

BRIEF DESCRIPTION OF THE DRAWINGS

Preferred embodiments of the invention now are described in greater detail with reference to the appended schematic drawings, wherein.

DETAILED DESCRIPTION OF THE PREFERRED EMBODIMENTS

Figure 1:
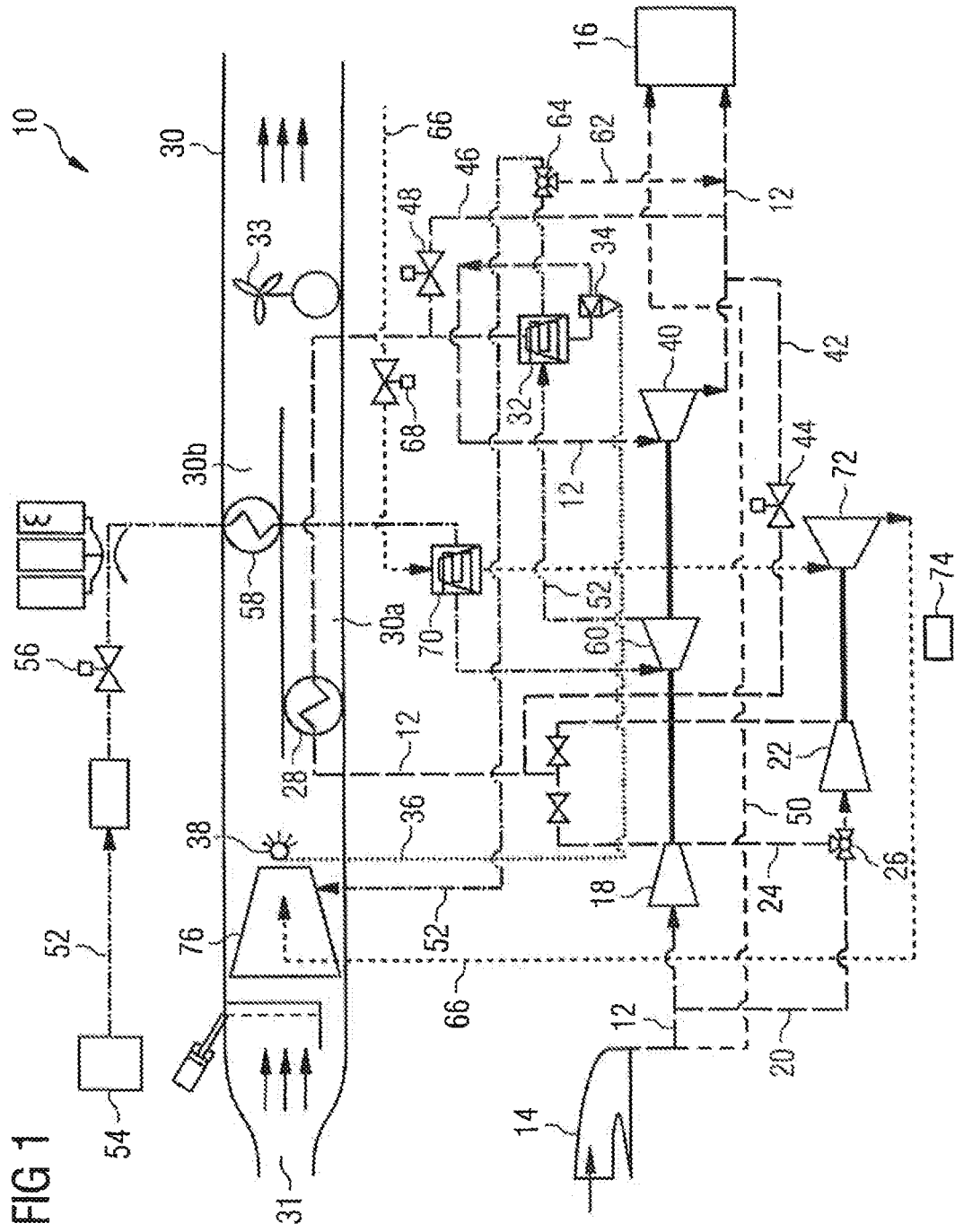
FIG. 1 shows a schematic representation of a first embodiment of an aircraft air conditioning system.

An aircraft air conditioning system 10 according to FIG. 1 comprises an ambient air supply line 12. The ambient air supply line 12 has a first end which is connected to an ambient air inlet 14. The ambient air inlet 14, in the embodiment of an aircraft air conditioning system 10 shown in the drawings, is designed in the form of a scoop inlet. A second end of the ambient air supply line 12 is connected to a mixer 16 of the aircraft air conditioning system 10. Within the mixer 16, ambient air supplied to the mixer 16 via the ambient air supply line 12 is mixed with recirculation air discharged from a cabin of an aircraft equipped with the aircraft air conditioning system 10. The mixed air generated within the mixer 16 finally is supplied to the aircraft cabin in order to air-condition the aircraft cabin.

The ambient air entering the aircraft air conditioning system 10 via the ambient air inlet 14 is supplied to a first compressor 18 which is arranged in the ambient air supply line 12. Within the first compressor 18, the ambient air is compressed to an elevated pressure. Furthermore, the compressed air exiting the first compressor 18 has a temperature which is higher than the temperature of the ambient air supplied to the first compressor 18.

An ambient air branch line 20 branches off from the ambient air supply line 12 upstream of the first compressor 18 and opens into the ambient air supply line 12 downstream of the first compressor 18. A second compressor 22 is arranged in the ambient air branch line 20 which is adapted to compress the ambient air flowing through the ambient air branch line 20. Thus, ambient air exiting the second compressor 22 has a higher pressure and also a higher temperature than the ambient air supplied to the second compressor 22.

A connecting line 24 connects the ambient air supply line 12 downstream of the first compressor 18 to the ambient air branch line 20 upstream of the second compressor 22. Via the connecting line 24, the first compressor 18 and the second compressor 24 can be connected in series, thus allowing compressed ambient air exiting the first compressor 18 to be further compressed by means of the second compressor 22. An ambient air supply control valve 26 is arranged in the region of an opening of the connecting line 24 into the ambient air branch line 20 and is adapted to control the supply of ambient air to the second compressor 22. In particular, the ambient air supply valve 26 is designed in the form of a three-way valve which allows to either interrupt or to allow the supply of ambient air to the second compressor 22 and, furthermore, to connect the first compressor 18 and the second compressor 22 either in parallel or in series.

Compressed ambient air exiting the first and the second compressor 18, 22, respectively, is supplied to an ambient air cooler 28 which is arranged in the ambient air supply line 12 downstream of the first compressor 18. The ambient air cooler 28 is disposed in a ram air channel 30 and thus is thermally coupled to the ram air channel 30. During flight operation of an aircraft equipped with the aircraft air conditioning system 10, ram air flows through the ram air channel 30, entering the ram air channel 30 via a ram air inlet 31. During ground operation of the aircraft, ambient air flows through the ram air channel 30, conveyed through the ram air channel 30 by means of a blower 33. Alternatively, instead of the blower 33, a jet pump may be used to convey ambient air through the ram air channel 30 during ground operation of the aircraft. The ram air flowing through the ram air channel 30 exits the ram air channel 30 via a ram air outlet. A ram air outlet flap (not shown) may be used to control the ram pressure in the ram air channel 30.

The ambient air flowing through the ambient air supply line 12 thus, in the ambient air cooler 28, is cooled by transporting heat energy from the ambient air to the ram air flowing through the ram air channel 30. In the specific embodiment of an aircraft air conditioning system 10 according to FIG. 1, the ambient air cooler 28 is disposed in a ram air channel branch 30a and thus cooled by the ram air flowing through the ram air channel branch 30a.

In the embodiments of an aircraft air conditioning system 10 which are depicted in the drawings, the ambient air inlet 14 and the ram air inlet 31 are designed as separate devices. It is, however, also conceivable to design the ambient air inlet 14 and the ram air inlet 31 in the form of a combined air intake, in particular in the form of a combined NACA/Scoop air intake which may be equipped with a deflection flap. The size of the combined air intake may be adjusted to the operating conditions of the combined air intake during flight operation of an aircraft equipped with the aircraft air conditioning system 10. Furthermore, the combined air intake may comprise a ground inlet flap for suitably controlling the supply of air via the combined air intake during ground operation of the aircraft.

Ambient air exiting the ambient air cooler 28 further is directed to a condenser 32 which is disposed in the ambient air supply line 12 downstream of the ambient air cooler 28. Within the condenser 32, the ambient air is cooled below the dew point of water in order to transfer free water contained in the ambient air flowing through the ambient air supply line 12 into the liquid state of aggregation. The liquid water condensed within the condenser 32 is extracted from the ambient air stream flowing through the ambient air supply line 12 via a water separator 34 which is disposed in the ambient air supply line 12 downstream of the condenser 32.

The water extracted from the ambient air stream by means of the water separator 34, via a water supply line 36, is directed to the ram air channel 30. In particular, the water is injected into the ram air channel 30 via an injector nozzle 38 disposed in the ram air channel 30. By the injection of water, the ram air flowing through the ram air channel 30 can be cooled thus enhancing the cooling capacity of the ram air channel 30. As a result, the ram air flow through the ram air channel 30 and thus the aerodynamic drag caused by the ram air channel 30 can be reduced without affecting the cooling capacity of the ram air channel 30.

Finally, prior to being supplied to the mixer 16, the ambient air flowing through the ambient air supply line 12 is supplied to an ambient air turbine 40 which is arranged in the ambient air supply line 12 downstream of the water separator 34. Within the ambient air turbine 40, the ambient air is expanded and thus cooled. In order to prevent the ambient air turbine 40 from being damaged by remaining water droplets in the flow of ambient air downstream of the water separator 34, the ambient air turbine 40 may be of a robust design which is not sensitive to water droplets. Alternatively or additionally thereto, an additional reheater (not shown) may be provided in the ambient air supply line 12 upstream of the ambient air turbine 40 which serves to evaporate any remaining water droplets in the flow of ambient air before the flow of ambient air is supplied to the ambient air turbine 40.

The aircraft air conditioning system 10 further comprises a trim air line 42 which branches off from the ambient air supply line 12 between the first compressor 18 and the ambient air cooler 28 and which opens into the ambient air supply line 12 downstream of the ambient air turbine 40. The flow of trim air through the trim air line 42 is controlled via a trim air valve 44 arranged in the trim air line 42. Via the trim air line 42, ambient air exiting the first and the second compressor 18, 22, respectively, and thus having an elevated pressure and an elevated temperature can be supplied to the ambient air flowing through the ambient air supply line 12 downstream of the ambient air turbine 40 and thus having a lower pressure and a lower temperature so as to adjust the pressure and the temperature of the ambient air flowing through the ambient air supply line 12 as desired before the ambient air is supplied to the mixer 16. In case the aircraft air conditioning system 10 should be used for heating purposes, the trim air valve 44 can be suitably controlled in order to allow a higher volume flow of hot ambient air exiting the first and the second compressor 18, 22, respectively, to be directed into the mixer 16 via the trim air line 42.

An altitude vent line 46 branches off from the ambient air supply line 12 upstream of the condenser 32 and hence also upstream of the ambient air turbine 40 and opens into the ambient air supply line 12 downstream of the ambient air turbine 40. The altitude vent line 46 thus bypasses the condenser 32, the water separator 34 and the ambient air turbine 40. The flow of ambient air through the altitude vent line 46 is controlled by means of an altitude vent valve 48 which is arranged in the altitude vent line 46. By guiding ambient air through the altitude vent line 46 so as to bypass the condenser 32, the water separator 34 and the ambient air turbine 40, the permeability of ambient air through the ambient air supply line 12 can be increased and thus the effort for pressurizing the ambient air in the first and the second compressor 18, 22, respectively, can be reduced. This is particularly advantageous when an aircraft equipped with the aircraft air conditioning system 10 is operated at cruising altitude at a low ambient pressure.

In case the aircraft air conditioning system 10 should be used for heating purposes, the first and/or the second cabin air compressor 18, 22 typically is/are operated in such a manner that the ambient air flowing through the ambient air supply line 12 is compressed to a pressure which exceeds the pressure in the aircraft cabin supplied with conditioned air by the aircraft air conditioning system 10. The altitude vent valve 48 and/or the trim air valve 44 then may be used as throttling devices for reducing the pressure of the ambient air flowing through the ambient air supply line 12 before being supplied to the mixer 16.

Finally, an emergency ambient air supply line 50 directly connects the ambient air inlet 14 to the mixer 16 of the aircraft air conditioning system 10. The supply of ambient air to the emergency ambient air supply line 40 may be controlled via a suitable valve (not shown in the drawings). In the event of a failure of the aircraft air conditioning system 10, ambient air can be supplied to the mixer 16 via the emergency ambient air supply line 50 in order to satisfy at least a basic ambient air demand of the mixer 16.

The aircraft air conditioning system 10 further comprises a bleed air supply line 52 which allows a flow of bleed air bled off from an engine 54 of an aircraft equipped with the aircraft air conditioning system 10 therethrough. A first end of the bleed air supply line 52 is connected to the engine 54. Alternatively, the bleed air supply line 52 can be connected to an auxiliary power unit of the aircraft so as to be supplied with bleed air from the auxiliary power unit. A bleed air control valve 56, which is arranged in the bleed air supply line 52, serves to control the flow of bleed air through the bleed air supply line 52. A second end of the bleed air supply line 52 is connected to the aircraft environment, i.e., the ambient atmosphere so as to discharge the bleed air flowing through the bleed air supply line 52 over board. Specifically, the second end of the bleed air supply line 52 is connected to the ram air channel 30 such that the bleed air exiting the bleed air supply line 52 is discharged to the aircraft environment via the ram air channel 30.

The bleed air supplied to the aircraft air conditioning system 10 via the bleed air supply line 52 first is supplied to a precooler 58 which is disposed in the bleed air supply line 52 and which is thermally coupled to the ram air channel 30. Thus, the bleed air flowing through the bleed air supply line 52, in the precooler 58, is cooled by the transport of heat energy from the bleed air flowing through the bleed air supply line 52 to the ram air flowing through the ram air channel 30. In particular, in the arrangement shown in FIG. 1, the precooler 58 is disposed in a second ram air channel branch 30b arranged in parallel to the first ram air channel branch 30a. Thus, the ambient air cooler 28 and the precooler 58 are arranged in the ram air channel 30 in parallel allowing the ambient air cooler 28 and the precooler 58 to be cooled by ram air flowing through the ram air channel 30 independent from each other, i.e., with ram air having substantially the same temperature.

Precooled bleed air exiting the precooler 58, via the bleed air supply line 52, is directed to a bleed air turbine 60 so as to drive the bleed air turbine 60 and to be thereby expanded and cooled. The bleed air turbine 60 is coupled to the first compressor 18. In particular, the bleed air turbine 60 is arranged with the first compressor 18 and the ambient air turbine 40 on a common shaft. In the aircraft air conditioning system 10, the driving energy for driving the first compressor 18 thus is provided by the bleed air turbine 60 driven by the bleed air flowing through the bleed air supply line 52. An optimum use of the energy contained in the ambient air flowing the ambient supply line 12 is made by coupling the first compressor 18 also to the ambient air turbine 40 in order to provide additional driving energy to the first compressor 18.

The bleed air exiting the bleed air turbine 60, via the bleed air supply line 52, is directed to the condenser 32. Thus, the condenser 32 is thermally coupled to the bleed air supply line 52 and the ambient air flowing through the ambient air supply line 12, in the condenser 32, is cooled by the transport of heat energy from the ambient air to the bleed air flowing through the bleed air supply line 52. The bleed air exiting the condenser 32 is discharged into the ram air channel 30 as described above.

A backup line 62 branches off from the bleed air supply line 52 downstream of the condenser 32. The backup line opens into the ambient air supply line 12 downstream of the ambient air turbine 40. The flow of bleed air through the backup line 62 is controlled by means of a backup valve 64. The backup valve 64 is designed in the form of a three-way valve which is arranged in the region of a branch point between the bleed air supply line 52 and the backup line 62. Via the backup line 62, in the event of a failure of the aircraft air conditioning system 10, bleed air can be directed to the mixer 16 in order to satisfy a basic air demand of the mixer 16. However, during normal operation of the aircraft air conditioning system 10, the backup valve 64 is closed so as to ensure that the mixer 16 is exclusively supplied with ambient air and, if desired, recirculation air which is recirculated from the aircraft cabin to be air conditioned.

The aircraft air conditioning system 10 further comprises a cabin exhaust air line 66 allowing a flow of cabin exhaust air there through. In particular, the cabin exhaust air line 66 is connected to the aircraft cabin and serves to discharge cabin exhaust air from the aircraft cabin, wherein the flow of cabin exhaust air through the cabin exhaust air line 66 is controlled via a cabin exhaust air control valve 68. After being discharged from the aircraft cabin, the cabin exhaust air first is directed through a reheater 70 which is arranged in the cabin exhaust air line 66. Within the reheater 70, the cabin exhaust air flowing through the cabin exhaust air line 66 is heated to an elevated temperature. The reheater 70 is thermally coupled to the bleed air supply line 52 downstream of the precooler 58. Thus, the cabin exhaust air flowing through the cabin exhaust air line 66, in the reheater 70, is heated by the transport of heat energy from the bleed air flowing through the bleed air supply line 52 to the cabin exhaust air flowing through the cabin exhaust air line 66.

The cabin exhaust air exiting the reheater 70 is directed to a cabin exhaust air turbine 72 so as to drive the cabin exhaust air turbine 72 and to thereby be expanded and cooled. The cabin exhaust air turbine 72 driven by the cabin exhaust air flowing through the cabin exhaust air line 66 is coupled to the second compressor 22 so as to drive the second compressor 22. In particular, the second compressor 22 and the cabin exhaust air turbine 72 are disposed on a common shaft. Thus, the energy contained in the cabin exhaust air is used to drive the second compressor 22 in order to provide the mixer 16 with a sufficient amount of compressed ambient air also when the aircraft equipped with the aircraft air conditioning system 10 is operated at high altitude, i.e., at a low ambient pressure.

An electronic control unit 74 of the aircraft air conditioning system 10 is adapted to control the operation of the cabin exhaust air control valve 68 and the ambient air supply control valve 26. In particular, the electronic control unit 74 controls the operation of the cabin exhaust air control valve 68 and the operation of the ambient air supply control valve 26 in a synchronized manner in dependence on an ambient air demand of the aircraft air conditioning system 10. In particular, the cabin exhaust air control valve 68 and the ambient air supply control valve 26, under the control of the electronic control unit 74, are opened in a synchronized manner so as to increase the supply of cabin exhaust air to the cabin exhaust air turbine 72 and to also increase the supply of ambient air to the second compressor 22 in order to satisfy an increased ambient air demand of the aircraft air conditioning system 10. To the contrary, the cabin exhaust air control valve 68 and the ambient air supply control valve 26, under the control of the electronic control unit 74, are closed so as to reduce the supply of cabin exhaust air to the cabin exhaust air turbine 72 and the supply of ambient air to the second compressor 22 in response to a reduced ambient air demand of the aircraft air conditioning system 10.

Furthermore, as already indicated above, by suitably controlling the ambient air supply control valve 26 by means of the electronic control unit 74, the first compressor 18 and the second compressor 22 may be operated in parallel or in series, as desired. Parallel operation of the first compressor 18 and the second compressor 22 may lead to a reduced ram air consumption of the aircraft air conditioning system 10, but typically leads to a slightly higher bleed air demand.

Cabin exhaust exiting the cabin exhaust air turbine 72 is discharged into the ram air channel 30. In particular, the cabin exhaust air line 66 is connected to an ejector 76 which is disposed in the ram air channel 30 and which is adapted to inject the cabin exhaust air flowing through the cabin exhaust air line 66 into the ram air channel 30. By injecting cool cabin exhaust air into the ram air channel 30, the cooling capacity of the ram air channel 30 can be increased. The ejector 76 is driven by the bleed air exiting the bleed air supply line 52, thus allowing a particularly energy efficient operation of the ejector 76.

Figure 2:
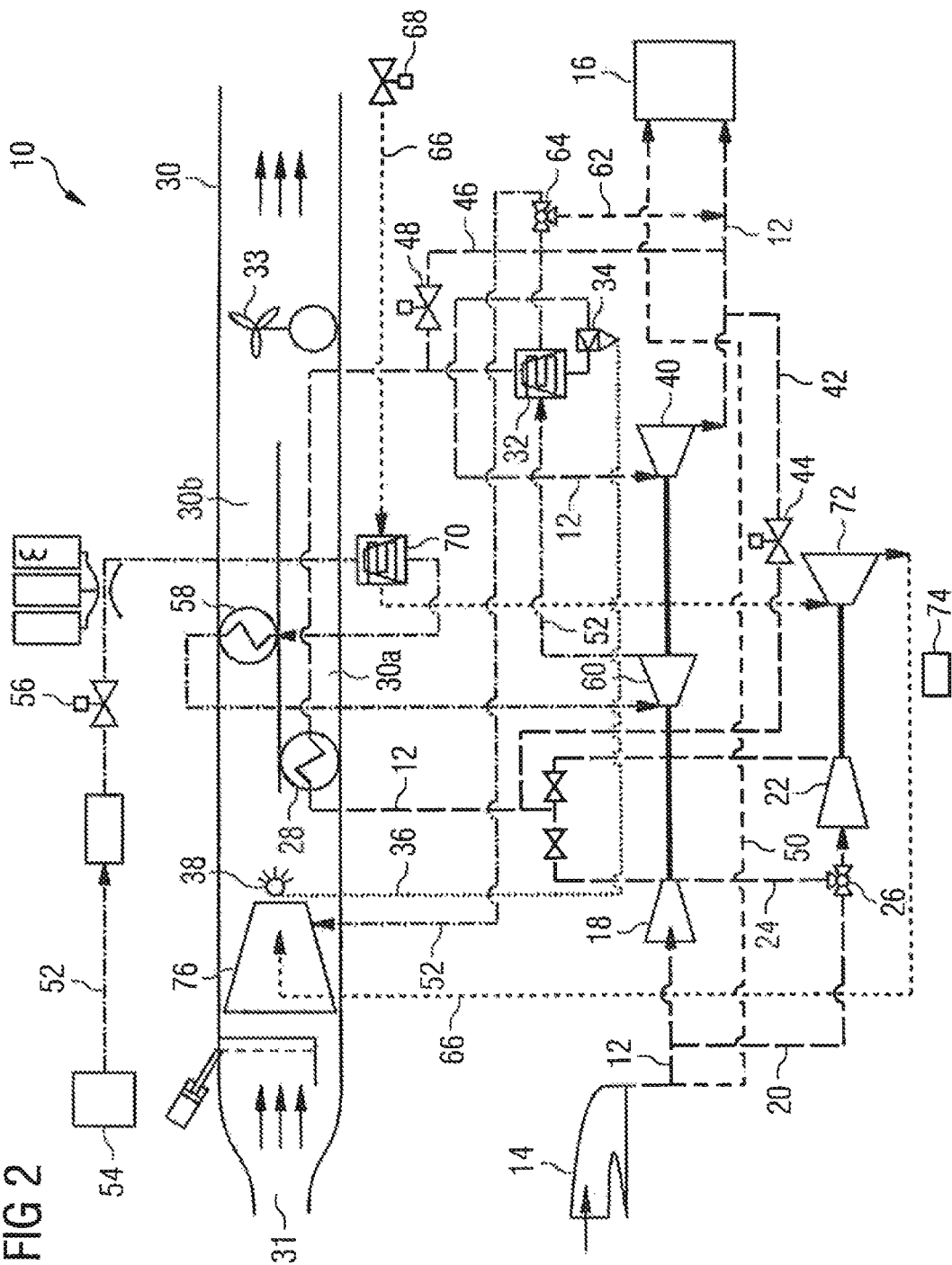
FIG. 2 shows a schematic representation of a second embodiment of an aircraft air conditioning system.

The aircraft air conditioning system 10 depicted in FIG. 2 differs from the arrangement according to FIG. 1 only in that the reheater 70 is thermally coupled to the bleed air supply line 52 upstream of the precooler 58. While by arranging the reheater upstream of the precooler, the bleed air consumption of the aircraft air conditioning system 10 can be reduced, an arrangement of the reheater 70 downstream of the precooler 58 as shown in FIG. 1 allows a decrease of the ram air flow through the ram air channel 30. Otherwise, the structure and the function of the aircraft air conditioning system 10 according to FIG. 2 correspond to the structure and the function of the arrangement depicted in FIG. 1.

Figure 3:
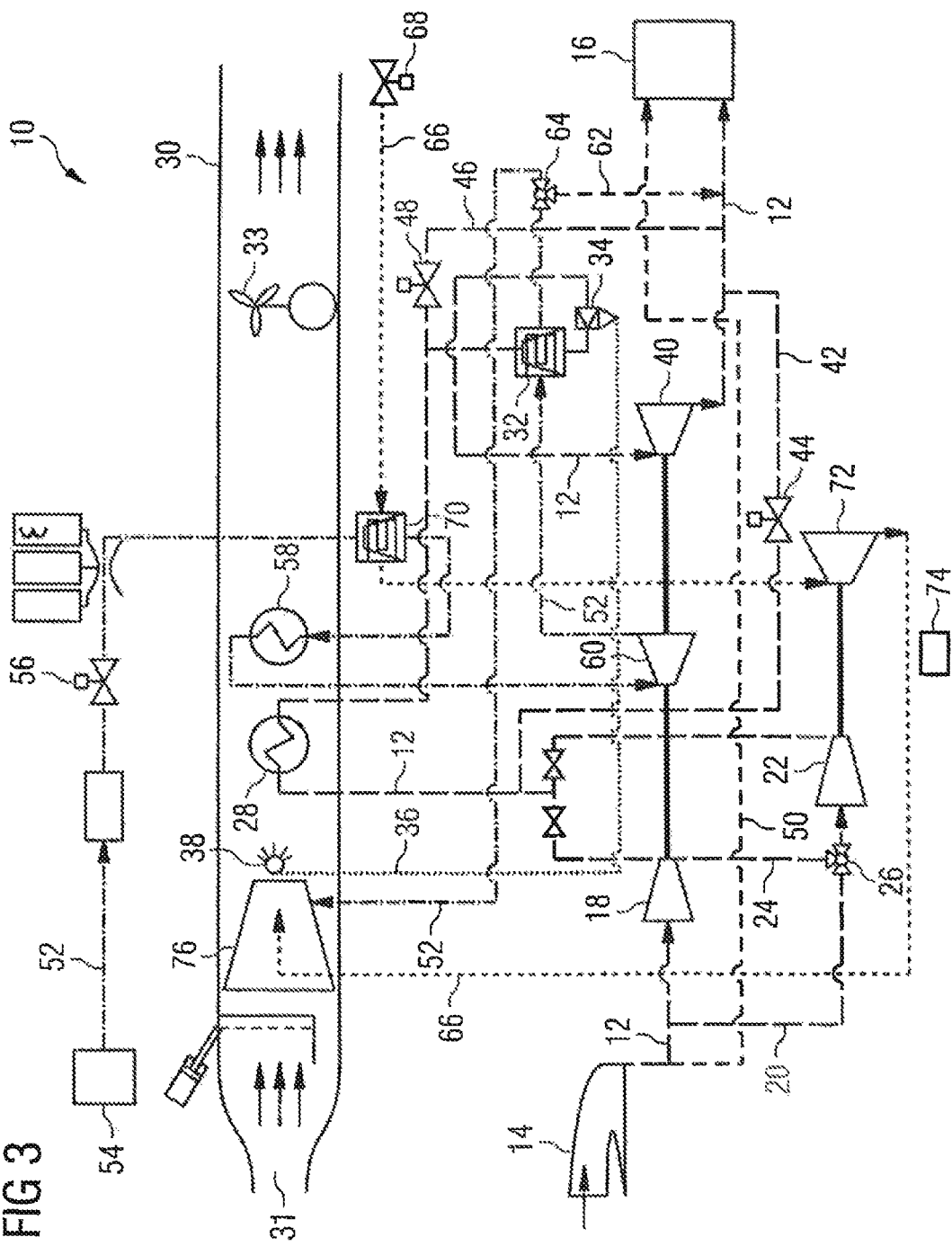
FIG. 3 shows a schematic representation of a third embodiment of an aircraft air conditioning system.

The aircraft air conditioning system 10 according to FIG. 3 differs from the configuration according to FIG. 2 in that the ram air channel 30 no longer comprises a first ram air channel branch 30a and a second ram air channel branch 30b. Instead, the ambient air cooler 28 and the precooler 58 are arranged in the ram air channel 30 in series. In particular, the ambient air cooler 28 is arranged in the ram air channel 30 upstream of the precooler 58. In the configuration according to FIG. 3, the precooler 58 thus is supplied with ram air which is already heated by the transfer of heat from the ambient air flowing through the ambient air supply line 12 in the ambient air cooler 28. However, the ram air channel 30, in the aircraft air conditioning system 10 according to FIG. 3, is of a particularly simple and thus lightweight design. Otherwise, the structure and the function of the aircraft air conditioning system 10 according to FIG. 3 correspond to the structure and the function of the arrangement depicted in FIG. 2.

Figure 4:
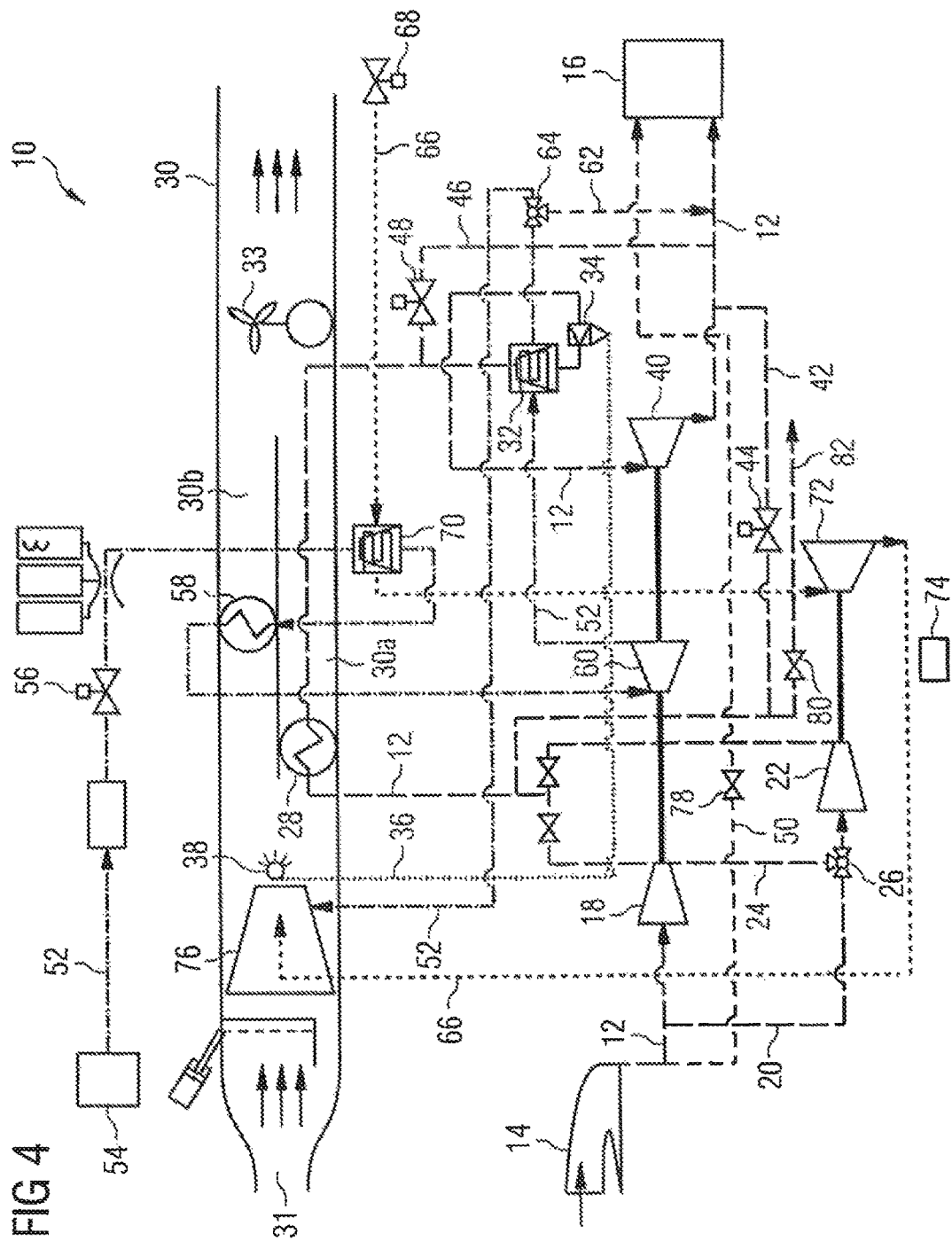
FIG. 4 shows a schematic representation of a fourth embodiment of an aircraft air conditioning system.

The aircraft air conditioning system 10 according to FIG. 4 differs from the configuration according to FIG. 3 in that a shut off valve 78 is installed in the emergency ambient air supply line 50. If need be, the shut off valve 78 is opened to allow air flowing into the mixer 16. Furthermore, an additional trim air line 80 branches off from the trim air line 42 upstream of the trim air valve 44. The additional trim air line 80 can be used to supply trim air to other areas than the mixer 16. A trim air regulation valve 82 installed in the additional trim air line 80 is used to modulate this trim air flow. Otherwise, the structure and the function of the aircraft air conditioning system 10 according to FIG. 4 correspond to the structure and the function of the arrangement depicted in FIG. 3.

Figure 5:
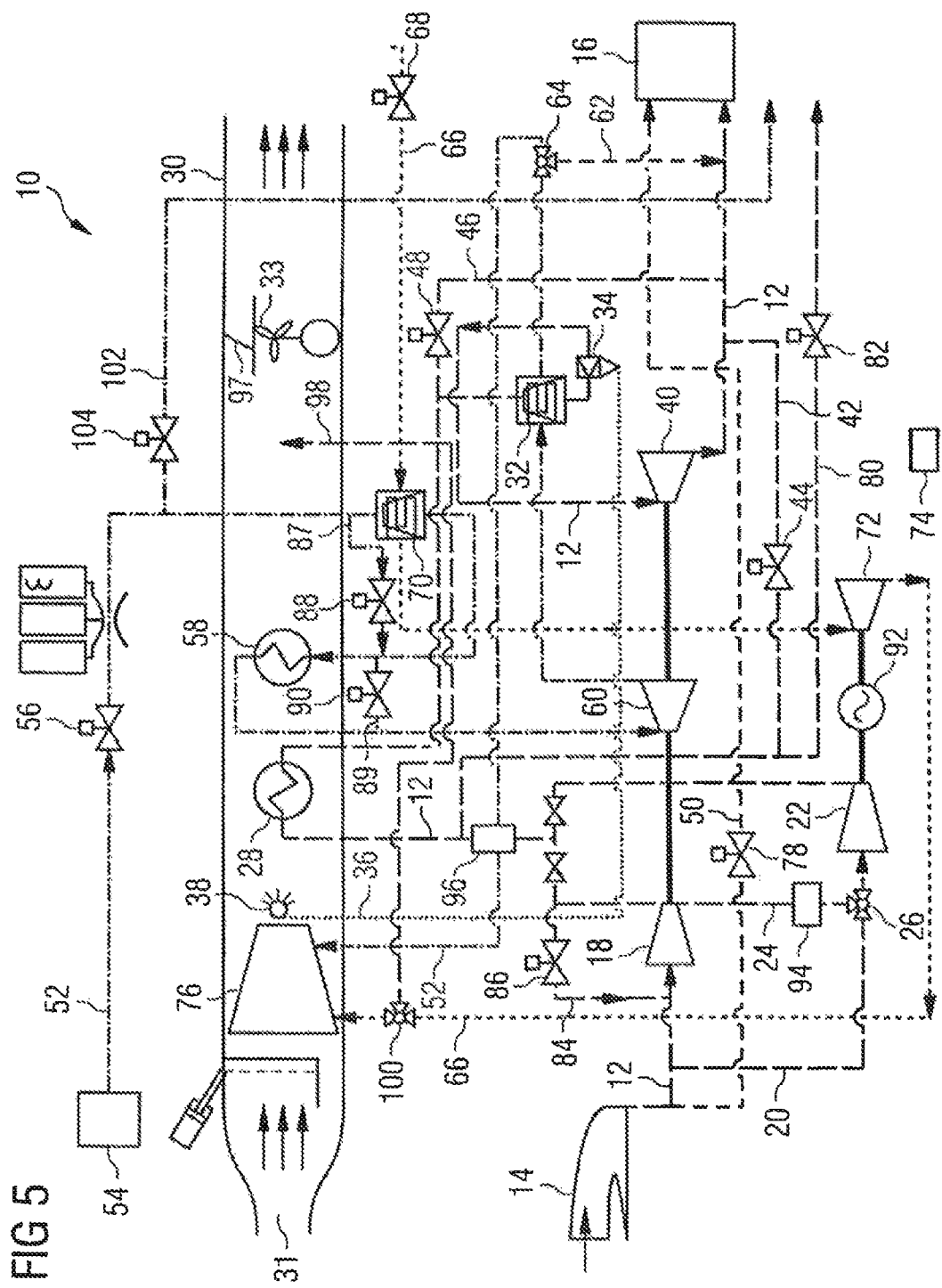
FIG. 5 shows a schematic representation of a fifth embodiment of an aircraft air conditioning system.

The aircraft air conditioning system 10 according to FIG. 5 differs from the configuration according to FIG. 3 in that, like in the arrangement of FIG. 4, a shut off valve 78 is installed in the emergency ambient air supply line 50. Furthermore, like the arrangement of FIG. 4, also the aircraft air conditioning system 10 according to FIG. 5 comprises an additional trim air line 80 which branches off from the trim air line 42 upstream of the trim air valve 44 and a trim air regulation valve 82 which is installed in the additional trim air line 80 for modulating the trim air flow through the additional trim air line.

The aircraft air conditioning system 10 according to FIG. 5 further comprises a compressed air recirculation line 84 which branches off from the ambient air supply line 12 downstream of the first compressor 18 and which opens back into the ambient air supply line 12 upstream of the first compressor 18. Thus, compressed air exiting the first compressor 18, via the compressed air recirculation line 84, may be recirculated to the first compressor 18 to be compressed again. This allows an improvement of the heating performance of the aircraft air conditioning system 10 in case the aircraft air conditioning system 10 should be used for heating purposes. The flow of compressed air exiting the first compressor 18 through the compressed air recirculation line 84 back to the first compressor 18 is controlled via a recirculation control valve 86.

The aircraft air conditioning system 10 according to FIG. 5 also is equipped with a bypass line 87 which connects a portion of the bleed air supply line 52 extending upstream of the reheater 70 to a portion of the bleed air supply line 52 extending downstream of the reheater 70, so as to bypass the reheater 70. A bypass valve 88 is arranged in the bypass line 87 so as to control the flow of bleed air through the bypass line 87. A further bypass line 89 connects a portion of the bleed air supply line 52 extending between the reheater 70 and the precooler 58 to a portion of the bleed air supply line 52 extending downstream of the precooler 58, so as to bypass the precooler 58. A further bypass valve 90 is arranged in the further bypass line 89 so as to control the flow of bleed air through the further bypass line 89.

Operation of the bypass valves 88, 90 and hence the flows of bleed air through the bypass line 87 and the reheater 70, respectively, and the flows of bleed air through the further bypass line 88 and the precooler 58, respectively, may be controlled in dependence on a desired discharge temperature of the bleed air turbine 60 so as to optimize the cooling performance of the aircraft air conditioning system 10. Furthermore, by supplying a sufficient amount of hot bleed air which bypasses the reheater 70 and/or the precooler 58 to the bleed air turbine 60, icing of the bleed air turbine 60 can be prevented.

The aircraft air conditioning system 10 of FIG. 5, further comprises an electric motor 92 which is associated with the compressor/turbine arrangement defined by the second compressor 22 and the cabin exhaust air turbine 72. Under certain operating conditions of the aircraft air conditioning system 10, e.g., during ground or low altitude operation of an aircraft equipped with the aircraft air conditioning system 10 under humid ambient conditions, the discharge temperatures of the bleed air turbine 60 should not fall below 0° C. in order to avoid icing of the bleed air turbine 60. In case of a high cooling energy demand, the compressor/turbine arrangement defined by the second compressor 22 and the cabin exhaust air turbine 72 then has to provide for a sufficient cooling performance of the aircraft air conditioning system 10, wherein the electric motor 92, if need be, may boost the driving performance of the cabin exhaust air turbine 72 or may also be used as the only driving means for driving the second compressor 22. In addition, the compressor/turbine arrangement defined by the second compressor 22 and the cabin exhaust air turbine 72, when being provided with an additional electric motor 92 for boosting the driving performance of the cabin exhaust air turbine 72 may be used for driving a jet pump which is arranged in the ram air channel 30 for conveying ambient air through the ram air channel 30 during ground operation of the aircraft.

The electric motor 92 is coupled to the shaft coupling the second compressor 22 to the cabin exhaust air turbine 72 via a clutch (not shown). This allows the electric motor 92 to be decoupled from the shaft when the electric motor 92 is not in operation. In addition, also the cabin exhaust air turbine 72 is coupled to the shaft via a clutch (not shown) so as to allow a decoupling of the cabin exhaust air turbine 72 from the shaft when only the electric motor 92 operated for driving the second compressor 22.

In the aircraft air conditioning system 10 of FIG. 5, a heat exchanger 94 is disposed in the connecting line 24 connecting the outlet of the first compressor 18 to the inlet of the second compressor 22. The heat exchanger 94 acts as an intercooler and serves to cool the ambient air exiting the first compressor 18 before being supplied to the second compressor 22. As a result, the compression effort may be reduced. Moreover, the aircraft air conditioning system 10 comprises an ozone converter 96 which is disposed in the ambient air supply line 12 downstream of the first and the second compressor 18, 22.

The ram air channel 30 of the aircraft air conditioning system 10 depicted in FIG. 5 is equipped with a ram air check valve 97 which allows the ram air flowing through the ram air channel 30 to bypass the blower 33 during flight operation of an aircraft equipped with the aircraft air conditioning system 10 when a sufficient amount of ram air is available and operation of the blower 33 is not needed.

Alternatively, in case a ram air check valve 97 should be omitted, the blower 33 may be provided with variable fan blades.

A cabin exhaust air branch line 98 branches off from the cabin exhaust air line 66 just before the air enters the ejector 76 and opens into the ram air channel 30 downstream of the ambient air precooler 28 and the precooler 58. A cabin air dump valve 100 is disposed in the cabin exhaust air branch line 98 downstream of the cabin exhaust air turbine 72 and serves to control the flow of cabin exhaust air to be dumped either upstream of the ambient air precooler 28 and the precooler 58 or downstream of them. Since the cabin exhaust air branch line 98 opens into the ram air channel 30 downstream of the ambient air precooler 28 and the precooler 58, undesired heating of the ram air prior to being supplied to the ambient air precooler 28 and the precooler 58 due to the supply of cabin exhaust air to the ram air channel 30 can be avoided.

Finally, the aircraft air conditioning system 10 of FIG. 5 is equipped with a bleed air branch line 100 which branches off from the bleed air supply line 52 upstream of the reheater 70 and also upstream of an upstream-side connecting point of the bypass line 87 with the bleed air supply line 52. Hot (untreated) bleed air thus flows through the bleed air branch line 100. A hot air regulation valve 102 is disposed in the bleed air branch line 100 and serves to control the flow of hot bleed air through the bleed air branch line 100. In case the aircraft air conditioning system 10 should be used for heating purposes, the hot air regulation valve 102 can be suitably controlled in order to allow a desired volume flow of hot bleed air to be used for heating purposes, wherein the bleed air may be used in addition to or instead of hot ambient air flowing through the additional trim air line 80.

It should, however, be noted that the bleed air flowing through the bleed air branch line 100 is not directed into the mixer 16, thus ensuring that, at least during normal operation of the aircraft air conditioning system 10, the mixer 16 is exclusively supplied with ambient air and, if desired, recirculation air which is recirculated from the aircraft cabin to be air conditioned. Otherwise, the structure and the function of the aircraft air conditioning system 10 according to FIG. 4 correspond to the structure and the function of the arrangement depicted in FIG. 3.

Figure 6:
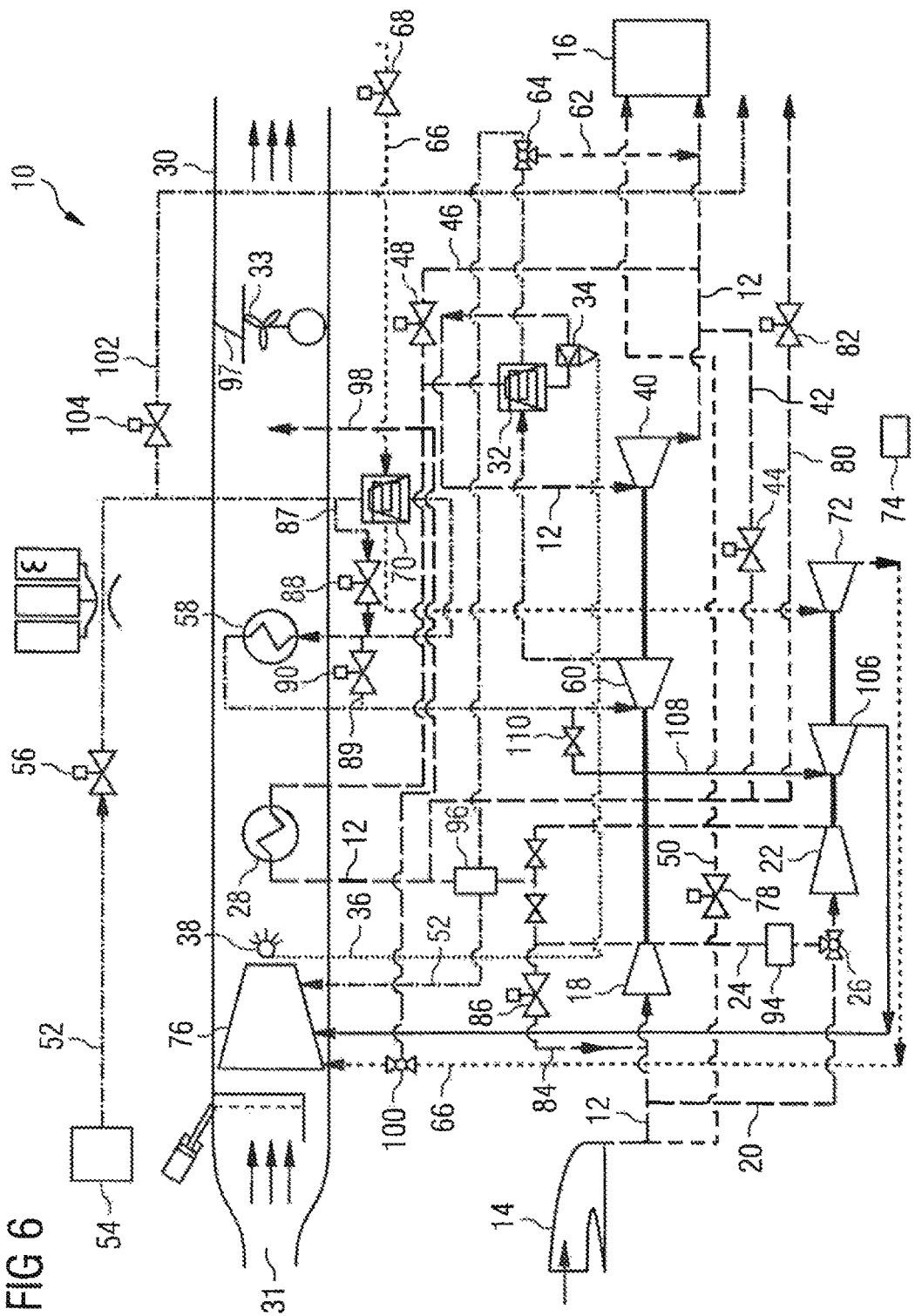
FIG. 6 shows a schematic representation of a sixth embodiment of an aircraft air conditioning system.

The aircraft air conditioning system 10 according to FIG. 6 differs from the configuration according to FIG. 5 in that, instead of the electric motor 92, a further bleed air driven turbine 106 is used boost the cabin exhaust air turbine 72 when needed. The further bleed air driven turbine 106 is supplied with bleed air via a bleed air branch line 108 branching off from the bleed air supply line 52 upstream of the bleed air turbine 60. The flow of bleed air through the bleed air branch line 108 is controlled by means of a valve 110. The expanded bleed air is discharged into the ram air channel via a discharge line 112 and the ejector 76. Otherwise, the structure and the function of the aircraft air conditioning system 10 according to FIG. 6 correspond to the structure and the function of the arrangement depicted in FIG. 5.

Although specific features of the aircraft air conditioning system 10 are described herein with reference to specific embodiments, these features may be combines as desired. For example, also the aircraft air conditioning system 10 of FIG. 1 may be equipped with an additional trim air line 80 or the aircraft air conditioning system 10 of FIG. 5 may be provided with a reheater 70 which is thermally coupled to the bleed air supply line 52 downstream of the precooler 58.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air conditioning system comprising:
    an ambient air supply line having a first end connected to an ambient air inlet and a second end connected to a mixer of the aircraft air conditioning system so as to supply ambient air to the mixer,
    a ram air channel in addition to the ambient air supply line, the ram air channel having a first end connected to a ram air inlet and a second end connected to an aircraft environment,
    a first compressor arranged in the ambient air supply line and being adapted to compress ambient air flowing through the ambient air supply line,
    a bleed air supply line having a first end connected to an engine or an auxiliary power unit and a second end connected to the aircraft environment via the ram air channel, and
    a bleed air turbine driven by bleed air flowing through the bleed air supply line and being coupled to the first compressor so as to drive the first compressor,
    the bleed air supply line opening into the ram air channel and being configured to guide bleed air flowing through the bleed air supply line into the ram air channel so as to discharge the bleed air to the aircraft environment.

2. The aircraft air conditioning system according to claim 1, further comprising:
    an ambient air branch line branching off from the ambient air supply line upstream of the first compressor and opening into the ambient air supply line downstream of the first compressor,
    a second compressor arranged in the ambient air branch line and being adapted to compress the ambient air flowing through the ambient air branch line,
    a cabin exhaust air line allowing a flow of cabin exhaust air therethrough, a cabin exhaust air control valve being arranged in the cabin exhaust air line so as to control the flow of cabin exhaust air through the cabin exhaust air line, and
    a cabin exhaust air turbine driven by the cabin exhaust air flowing through the cabin exhaust air line and being coupled to the second compressor so as to drive the second compressor.

3. The aircraft air conditioning system according to claim 2, further comprising at least one of:
    a connecting line connecting the ambient air supply line downstream of the first compressor to the ambient air branch line upstream of the second compressor,
    an ambient air supply control valve adapted to control the supply of ambient air to the second compressor, wherein the ambient air supply control valve is adapted to control at least one of the flow of ambient air through the connecting line and the flow of ambient air through the ambient air branch line, an electronic control unit adapted to control the operation of the cabin exhaust air control valve and the ambient air supply control valve in a synchronized manner in dependence on an ambient air demand of the aircraft air conditioning system by opening the cabin exhaust air control valve and the ambient air supply control valve so as to increase the supply of cabin exhaust air to the cabin exhaust air turbine and to also increase the supply of ambient air to the second compressor in order to satisfy an increased ambient air demand of the aircraft air conditioning system and by closing the cabin exhaust air control valve and the ambient air supply control valve so as to reduce the supply of cabin exhaust air to the cabin exhaust air turbine and the supply of ambient air to the second compressor in response to a reduced ambient air demand of the aircraft air conditioning system, a compressed air recirculation line connecting a portion of the ambient air supply line which extends downstream of the first compressor with a portion of the ambient air supply line which extends upstream of the first compressor, and a recirculation control valve adapted to control the flow of compressed air exiting the first compressor through the compressed air recirculation line back to the first compressor.

4. The aircraft air conditioning system according to claim 2, further comprising a reheater arranged in the cabin exhaust air line, upstream of the cabin exhaust air turbine, and being thermally coupled to the bleed air supply line so as to transport heat energy from the bleed air flowing through the bleed air supply line to the cabin exhaust air flowing through the cabin exhaust air line.

5. The aircraft air conditioning system according to claim 4, wherein the reheater is thermally coupled to the bleed air supply line either upstream or downstream of a precooler arranged in the bleed air supply line, the precooler being thermally coupled to a ram air channel so as to transport heat energy from the bleed air flowing through the bleed air supply line to ram air flowing through the ram air channel.

6. The aircraft air conditioning system according to claim 5, further comprising:
an ambient air cooler arranged in the ambient air supply line, downstream of the first compressor, and being thermally coupled to the ram air channel so as to transport heat energy from the ambient air flowing through the ambient air supply line to ram air flowing through the ram air channel,
a condenser arranged in the ambient air supply line, downstream of the ambient air cooler, and being thermally coupled to the bleed air supply line so as to transport heat energy from the ambient air flowing through the ambient air supply line to the bleed air flowing through the bleed air supply line,
a water separator arranged in the ambient air supply line, downstream of the condenser,
an ambient air turbine driven by the ambient air flowing through the ambient air supply line and being coupled to the first compressor so as to drive the first compressor, a trim air line branching off from the ambient air supply line between the first compressor and the ambient air cooler and opening into the ambient air supply line downstream of the ambient air turbine,
an altitude vent line branching off from the ambient air supply line upstream of the ambient air turbine, upstream of the condenser, and opening into the ambient air supply line downstream of the ambient air turbine, an altitude vent valve being arranged in the altitude vent line so as to control the flow of ambient air through the altitude vent line,
an emergency ambient air supply line directly connecting the ambient air inlet to the mixer of the aircraft air conditioning system,
a bypass line adapted to bypass the reheater,
a bypass valve adapted to control the flow of bleed air through the bypass line,
a further bypass line adapted to bypass the precooler,
a further bypass valve adapted to control the flow of bleed air through the further bypass line,
a cabin exhaust air branch line branching off from the cabin exhaust air line, downstream of the cabin exhaust air turbine, and opening into the ram air channel, downstream of the ambient air cooler and the precooler, and
a cabin air dump valve adapted to control the flow of cabin exhaust air, downstream of the cabin exhaust air turbine, through the cabin exhaust air branch line.

7. The aircraft air conditioning system according to claim 6, further comprising at least one of:
a backup line branching off from the bleed air supply line, downstream of the condenser, and opening into the ambient air supply line, downstream of the ambient air turbine, a backup valve being arranged in the backup line so as to control the flow of bleed air through the backup line, and
a bleed air branch line branching off from the bleed air supply line and adapted to have hot bleed air flowing therethrough, wherein a hot air regulation valve is adapted to control the flow of hot bleed air through the bleed air branch line.

8. The aircraft air conditioning system according to claim 2, wherein at least one of the bleed air supply line and the cabin exhaust air line opens into the ram air channel, wherein the cabin exhaust air line is connected to an ejector disposed in the ram air channel adapted to inject the cabin exhaust air flowing through the cabin exhaust air line into the ram air channel and which is driven by the bleed air exiting the bleed air supply line.

9. A method of operating an aircraft air conditioning system, the method comprising the steps:
guiding a flow of ambient air through an ambient air supply line having a first end connected to an ambient air inlet and a second end connected to a mixer of the aircraft air conditioning system so as to supply ambient air to the mixer, the flow of ambient air being controlled by a shut off valve,
guiding a flow of ram air through a ram air channel having a first end connected to a ram air inlet and a second end connected to an aircraft environment, the ram air channel being additionally provided to the ambient air supply line,
compressing the ambient air flowing through the ambient air supply line via a first compressor arranged in the ambient air supply line,
guiding a flow of bleed air bled off from an engine or an auxiliary power unit through a bleed air supply line having a first end connected to the engine or the auxiliary power unit and a second end connected to the aircraft environment via the ram air channel, and driving a bleed air turbine by the bleed air flowing through the bleed air supply line, the bleed air turbine being coupled to the first compressor so as to drive the first compressor, and the bleed air supply line opening into the ram air channel so as to guide bleed air flowing through the bleed air supply line into the ram air channel and to discharge the bleed air to the aircraft environment.

10. The method according to claim 9, further comprising the steps of:

guiding a flow of ambient air through an ambient air branch line branching off from the ambient air supply line upstream of the first compressor and opening into the ambient air supply line downstream of the first compressor, compressing the ambient air flowing through the ambient air branch line via a second compressor arranged in the ambient air branch line, guiding a flow of cabin exhaust air through a cabin exhaust air line, the flow of cabin exhaust air through the cabin exhaust air line being controlled via a cabin exhaust air control valve arranged in the cabin exhaust air line, and driving a cabin exhaust air turbine via the cabin exhaust air flowing through the cabin exhaust air line, the cabin exhaust air turbine being coupled to the second compressor so as to drive the second compressor.

11. The method according to claim 10, further comprising at least one of the steps of:

guiding a flow of ambient air through a connecting line connecting the ambient air supply line downstream of the first compressor to the ambient air branch line upstream of the second compressor, controlling the supply of ambient air to the second compressor via an ambient air supply control valve, by controlling, via the ambient air supply control valve, at least one of the flow of ambient air through the connecting line and the flow of ambient air through the ambient air branch line, controlling the operation of the cabin exhaust air control valve and the ambient air supply control valve in a synchronized manner in dependence on an ambient air demand of the aircraft air conditioning system by opening the cabin exhaust air control valve and the ambient air supply control valve so as to increase the supply of cabin exhaust air to the cabin exhaust air turbine and to also increase the supply of ambient air to the second compressor in order to satisfy an increased ambient air demand of the aircraft air conditioning system and by closing the cabin exhaust air control valve and the ambient air supply control valve so as to reduce the supply of cabin exhaust air to the cabin exhaust air turbine and the supply of ambient air to the second compressor in response to a reduced ambient air demand of the aircraft air conditioning system, guiding a flow of compressed air through a compressed air recirculation line connecting a portion of the ambient air supply line which extends downstream of the first compressor with a portion of the ambient air supply line which extends upstream of the first compressor, and controlling the flow of compressed air exiting the first compressor through the compressed air recirculation line back to the first compressor via a recirculation control valve.

12. The method according to claim 10, further comprising at least one of the steps of:

heating the cabin exhaust air flowing through the cabin exhaust air line via a reheater arranged in the cabin exhaust air line, upstream of the cabin exhaust air turbine, by transporting heat energy from the bleed air flowing through the bleed air supply line to the cabin exhaust air flowing through the cabin exhaust air line, and cooling the bleed air flowing through the bleed air supply line via a precooler arranged in the bleed air supply line, by transporting heat energy from the bleed air flowing through the bleed air supply line to ram air flowing through a ram air channel, wherein the reheater is thermally coupled to the bleed air supply line either upstream or downstream of the precooler.

13. The method according to claim 9, further comprising:

cooling the ambient air flowing through the ambient air supply line via an ambient air cooler arranged in the ambient air supply line, downstream of the first compressor, by transporting heat energy from the ambient air flowing through the ambient air supply line to ram air flowing through the ram air channel, condensing water contained in the ambient air flowing through the ambient air supply line via a condenser arranged in the ambient air supply line, downstream of the ambient air cooler, by transporting heat energy from the ambient air flowing through the ambient air supply line to the bleed air flowing through the bleed air supply line, separating water contained in the ambient air flowing through the ambient air supply line via a water separator arranged in the ambient air supply line, downstream of the condenser, driving an ambient air turbine by the ambient air flowing through the ambient air supply line, the ambient air turbine being coupled to the first compressor so as to drive the first compressor, guiding a flow of ambient air through a trim air line branching off from the ambient air supply line between the first compressor and the ambient air cooler and opening into the ambient air supply line downstream of the ambient air turbine, guiding a flow of ambient air through an altitude vent line branching off from the ambient air supply line upstream of the ambient air turbine, upstream of the condenser, and opening into the ambient air supply line downstream of the ambient air turbine, wherein the flow of ambient air through the altitude vent line is controlled via an altitude vent valve arranged in the altitude vent line, guiding a flow of ambient air through an emergency ambient air supply line directly connecting the ambient air inlet to the mixer of the aircraft air conditioning system, guiding a flow of bleed air through a bypass line to bypass the reheater, controlling the flow of bleed air through the bypass line via a bypass valve, guiding a flow of bleed air through a further bypass line to bypass the precooler, controlling the flow of bleed air through the further bypass line via a further bypass valve, guiding a flow of cabin exhaust air through a cabin exhaust air branch line branching off from the cabin exhaust air line, downstream of the cabin exhaust air turbine, and opening into the ram air channel, downstream of the ambient air precooler and the precooler, and controlling the flow of cabin exhaust air through the cabin exhaust air branch line, downstream of the cabin exhaust air turbine, via a cabin air dump valve.

14. The method according to claim 13, further comprising at least one of the steps of:

guiding a flow of bleed air through a backup line branching off from the bleed air supply line, downstream of the condenser, the flow of bleed air through the backup line being controlled via a backup valve arranged in the backup line, and guiding a flow of hot bleed air through a bleed air branch line branching off from the bleed air supply line, wherein the flow of hot bleed air through the bleed air branch line is controlled via a hot air regulation valve.

15. The method according to claim 9, wherein at least one of bleed air flowing through the bleed air supply line and cabin exhaust air flowing through the cabin exhaust air line is guided into the ram air channel, wherein the cabin exhaust air is supplied to the ram air channel via an ejector disposed in the ram air channel adapted to inject the cabin exhaust air flowing through the cabin exhaust air line into the ram air channel and which is driven by the bleed air exiting the bleed air supply line.

* * * * *